United States Patent
Mavridis et al.

(10) Patent No.: US 7,601,787 B2
(45) Date of Patent: Oct. 13, 2009

(54) ETHYLENE POLYMERIZATION PROCESS

(75) Inventors: Harilaos Mavridis, Lebanon, OH (US); Manivakkam J. Shankernararayanan, Cincinnati, OH (US)

(73) Assignee: Equistar Chemicals, IP, Houston, TX (US)

( * ) Notice: Subject to any disclaimer, the term of this patent is extended or adjusted under 35 U.S.C. 154(b) by 406 days.

(21) Appl. No.: 11/606,752

(22) Filed: Nov. 30, 2006

(65) Prior Publication Data

US 2008/0132640 A1 Jun. 5, 2008

(51) Int. Cl.
  *C08F 2/04* (2006.01)
  *C08F 2/01* (2006.01)
  *C08F 4/44* (2006.01)
  *C08L 23/06* (2006.01)
  *C08L 23/08* (2006.01)

(52) U.S. Cl. ............... 526/65; 526/64; 526/73; 526/116; 526/119; 526/123.1; 526/160; 526/943; 526/352; 526/348; 526/90; 526/905; 525/240; 525/53

(58) Field of Classification Search ............ 526/65
See application file for complete search history.

(56) References Cited

U.S. PATENT DOCUMENTS

| | | | |
|---|---|---|---|
| 4,336,352 A | 6/1982 | Sakurai et al. | 525/240 |
| 4,390,666 A | 6/1983 | Moriguchi et al. | 525/194 |
| 4,464,518 A | 8/1984 | Iwabuchi et al. | 526/127 |
| 4,603,173 A | 7/1986 | Mack et al. | 525/194 |
| 5,422,400 A | 6/1995 | Kamiyama et al. | 525/240 |
| 5,486,575 A | 1/1996 | Shroff | 525/333.8 |
| 6,221,982 B1 * | 4/2001 | Debras et al. | 526/64 |
| 6,458,910 B1 * | 10/2002 | Firdaus et al. | 526/348 |
| 6,462,136 B1 * | 10/2002 | Saito et al. | 525/240 |
| 6,486,270 B1 * | 11/2002 | Garrison et al. | 526/65 |
| 6,706,822 B2 | 3/2004 | Guenther et al. | 525/333.7 |
| 6,743,863 B2 | 6/2004 | Iizuka et al. | 525/191 |
| 6,878,454 B1 | 4/2005 | Shannon et al. | 428/523 |
| 7,034,092 B2 * | 4/2006 | Marechal | 526/65 |
| 2007/0004875 A1 * | 1/2007 | Gray et al. | 526/64 |
| 2008/0269421 A1 * | 10/2008 | Nilsen et al. | 525/240 |

FOREIGN PATENT DOCUMENTS

FI  EP-1777238  * 10/2005

OTHER PUBLICATIONS

R.N. Shroff et al., "Long Chain Branching Index For Essentially Linear Polyethylenes", *Macromolecules 32* (1999) 8454.
J. M. Dealy and K. F. Wissbrun, "Melt Rheology And Its Role In Plastics Processing", Van Nostrand Reinhold, New York (1990).

* cited by examiner

*Primary Examiner*—Patrick Ryan
*Assistant Examiner*—Ladan Mohaddes
(74) *Attorney, Agent, or Firm*—John Tyrell; Jonathan L. Schuchardt

(57) ABSTRACT

A process for polymerizing ethylene is disclosed. The polymerization is performed in the presence of a Ziegler-Natta catalyst system in two slurry reaction zones. Most of the polyethylene (70-95 wt. %) is produced in one of the zones, while a smaller fraction is produced in the other zone. The ratio of the weight average molecular weight of the smaller fraction to that of the larger fraction is greater than 8:1. The resulting polyethylene blend, which should have both high melt strength and high extrudate swell, will be useful for blow-molding applications.

11 Claims, No Drawings

ETHYLENE POLYMERIZATION PROCESS

FIELD OF THE INVENTION

This invention relates to a process for polymerizing ethylene in the presence of a Ziegler-Natta catalyst system in two slurry reaction zones to produce polyethylene with high melt strength and high extrudate swell.

BACKGROUND OF THE INVENTION

Polyethylene has desirable properties that have helped to make it the highest volume polymer manufactured. Ziegler-Natta catalysts are a mainstay for polyolefin manufacture and are used in slurry, solution, and gas-phase polymerizations. Certain applications, such as blow-molding, require a careful balance of rheological properties, and there is a continuing effort to develop polyethylene with improved properties.

Two properties that are important for many blow-molding applications are melt strength and extrudate swell. Melt strength determines how much deformation and sag the parison will experience as it is being formed before mold closing and inflation. When the pressure exerted by the die on the melt is released as the melt leaves the die, the melt swells. As the melt leaves the die, it extends and this parison sag influences parison dimensions and so affects melt swell. While high melt strength and high extrudate swell are desirable, generally extrudate swell decreases with increasing melt strength. When a resin exhibits too little swell, it can become difficult or impossible to properly fill out the extremities of the mold, such as the handle of a blow-molded bottle. Therefore, extrudate swell and melt strength are normally balanced to provide an acceptable combination of physical properties and processability.

Some blow-molding polyethylene grades are prepared from chromium oxide (Phillips) or single-site catalysts and rely on incorporating a high level of long-chain branching into the polyethylene. While some properties are improved, high levels of long-chain branching can hurt other properties. It would be desirable to be able to prepare polyethylene with excellent blow-molding properties with Ziegler-Natta catalyst systems while avoiding tradeoffs of other catalysts. For example, the poorer physical properties caused by long-chain branching and the processability and cost limitations of single-site catalysts are preferably avoided.

One possible solution is to crosslink the polyethylene. For example, U.S. Pat. No. 5,486,575 improves the properties of a polyethylene resin prepared from a chromium catalyst by using an organic peroxide. U.S. Pat. Nos. 4,390,666 and 4,603,173 use peroxides to crosslink a polyethylene blend containing high and low molecular weight components. U.S. Pat. No. 6,706,822 uses peroxides with polyethylene having a broad molecular weight distribution to reduce melt swell. U.S. Pat. No. 5,486,575 uses peroxides with polyethylene prepared with chromium catalysts. While some properties can be improved by crosslinking with peroxides, there are issues with this approach. The radicals produced can interact deleteriously with other additives. It is difficult to predict the effect of crosslinking on rheological properties. Reported results vary significantly from resin to resin, even when the resins are produced using similar catalyst technologies. Peroxides add an extra component to the composition, and they require careful handling and storage, which adds to the cost. It would be desirable to improve properties without using peroxides.

Another approach to improve properties, disclosed in U.S. Pat. Nos. 4,336,352, 5,422,400, and 6,743,863, is to use blends containing three resin components. The blends can be made in a three-step polymerization. U.S. Pat. No. 4,336,352 states that mixtures of high and low molecular weight polyethylene (or blends produced by a multi-step polymerization process) have such a low die swell that blow-molded bottles of consistent quality are difficult to obtain. Their solution includes a three-step polymerization. U.S. Pat. No. 5,422,400 states that earlier approaches with two-component mixtures have important limitations such as the need to use an ultrahigh molecular weight polyethylene having a minimum intrinsic viscosity or the need to prepare such a polymer at temperatures below 30° C. They overcome these limitations by using a three-step polymerization. Unfortunately, a three-component blend or a three-step polymerization is complicated and requires additional equipment.

Polyethylene produced in two-step or even one-step polymerizations can be blow molded. For example, U.S. Pat. No. 6,878,454 teaches films prepared from bimodal polyethylene prepared using a variety of processes from one stage to multistage. The polyethylene has greater than 50% by weight of the high molecular weight component, and it can be extruded at certain low melt temperatures. While melt strength and die swell are not disclosed, they should be low because the approach is similar to that used to make commercially available resins.

Despite continued efforts to improve polyethylene properties for blow molding, there is a need for a process that can produce polyethylene with both high melt strength and high extrudate swell, but which does not require the extra equipment and complications of a three-step polymerization.

SUMMARY OF THE INVENTION

The invention is an ethylene polymerization process. Ethylene is polymerized in the presence of a Ziegler-Natta catalyst system in two slurry reaction zones connected in series. Most of the polyethylene (70-95 wt. %) is produced in one of the zones, while a smaller fraction is produced in the other zone. The ratio of the weight average molecular weight of the smaller fraction to that of the larger fraction is greater than 8:1. The resulting polyethylene blend, which should have both high melt strength and high extrudate swell, will be useful for blow-molding applications.

DETAILED DESCRIPTION OF THE INVENTION

The invention is a process for polymerizing ethylene in the presence of a Ziegler-Natta catalyst system in a reactor consisting of two slurry reaction zones connected in series. It is desirable to make a broad molecular weight distribution in each of the zones. Preferably, the polydispersity ($M_w/M_n$) of the polyethylene prepared in each zone is greater than 3. This is readily achieved with Ziegler-Natta catalysts; in contrast, many single-site catalysts, including metallocenes, give polyethylenes with narrower molecular weight distributions.

By "Ziegler-Natta catalyst system," we mean a Ziegler-Natta catalyst in combination with a cocatalyst. Preferably, the cocatalyst is selected from the group consisting of trialkylaluminums, dialkylaluminum halides, and alkylaluminum dihalides. Suitable cocatalysts include triethylaluminum, triisobutylaluminum, diethylaluminum chloride, triisobutylaluminum chloride, butylaluminum dichloride, and the like, and mixtures thereof.

By "Ziegler-Natta catalyst," we mean a transition metal compound that incorporates a Group 4-8 transition metal, preferably a Group 4-6 transition metal, and one or more ligands that satisfy the valence of the metal. The ligands are preferably halide, alkoxy, hydroxy, oxo, alkyl, and combinations thereof. Ziegler-Natta catalysts exclude metallocenes or other single-site catalysts.

Preferably, the Ziegler-Natta catalyst system comprises a cocatalyst, a Group 4-6 transition metal compound, and a magnesium compound. Preferably, the transition metal compound incorporates Ti, V, or Cr, most preferably Ti. Such preferred transition metal compounds include titanium halides, titanium alkoxides, vanadium halides, and mixtures thereof, especially, $TiCl_3$, $TiCl_4$, mixtures of $VOCl_3$ with $TiCl_4$, and mixtures of $VCl_4$ with $TiCl_4$. Suitable magnesium compounds include magnesium halides, such as magnesium chloride, dialkyl magnesium compounds such as diethylmagnesium, and organic magnesium halides (i.e., Grignard reagents) such as methylmagnesium chloride, ethylmagnesium chloride, and butylmagnesium bromide.

One preferred Ziegler-Natta catalyst system is described in U.S. Pat. No. 4,464,518, the teachings of which are incorporated herein by reference. The catalyst preparation starts by reacting a polymethylhydrosiloxane with a Grignard reagent. This organomagnesium-siloxane reaction product then reacts with an organoaluminum compound to provide an organoaluminum-siloxane reaction product. Reaction of this "liquid support" with a halogen-containing Group 4-6 transition metal compound gives a supported transition metal mixture. The transition metal mixture and an alkylaluminum cocatalyst comprise the Ziegler-Natta catalyst system.

Optionally, hydrogen is used in the process of the invention to regulate polyolefin molecular weight. The amount of hydrogen needed depends upon the desired polyolefin molecular weight and melt flow properties. Generally, as the amount of hydrogen is increased, the polyolefin molecular weight decreases and the melt index increases. For many applications, the polyolefin melt index will be too low if the polymerization is performed in the absence of hydrogen. The process provides good control of molecular weight and melt flow properties by use of small amounts of hydrogen.

Optionally, ethylene is copolymerized with an α-olefin. Preferred α-olefins are propylene, 1-butene, 1-hexene, 1-octene, and mixtures thereof. The α-olefin can be used in either Zone A or Zone B or in both zones of the slurry polymerization.

The polymerizations are normally conducted under pressure. The pressure is preferably in the range of about 0.5 MPa to about 35 MPa, more preferably from about 5 MPa to about 25 MPa.

Ethylene is polymerized in two slurry reaction zones. The polymerization can be performed over a wide temperature range. Generally, lower temperatures give higher molecular weight and longer catalyst lifetimes. However, because the polymerization is exothermic, lower temperatures are more difficult and costly to achieve. A balance must be struck between these two factors. Preferably, the temperature is within the range of about 0° C. to about 110° C. A more preferred range is from about 60° C. to about 100° C.

Catalyst concentrations depend on many factors. Preferably, however, the concentration ranges from about 0.01 micromoles per liter to about 100 micromoles per liter.

Polymerization times depend on the type of process, the catalyst concentration, and other factors. Generally, polymerizations are complete within several seconds to several hours.

The process polymerizes ethylene in a reactor consisting of two slurry reaction zones, Zone A and Zone B, connected in series. Two reactors in series give good mixing of the two polyethylenes having different molecular weights. If the two reactors are parallel, the mixing is inferior. In a slurry polymerization, solid polyethylene is formed under polymerization conditions that include a slurry as the reaction mixture. The slurry comprises solid polyethylene particles suspended in a liquid, inert diluent. The polyethylene is insoluble under the polymerization conditions.

In Zone A, 70-95% by weight of the polyethylene is produced. Preferably, 80-90% by weight of the polyethylene is produced in Zone A. The ratio of the weight average molecular weight ($M_w$) of the polyethylene produced in Zone B to the $M_w$ of the polyethylene produced in Zone A is greater than 8:1, preferably greater than 10:1, and more preferably from 20:1 to 50:1. The $M_w$ in each of the zones can be regulated by known techniques such as choice of catalyst, reactor temperature, and amount of hydrogen used. While typically the Zone A reactor is first in series followed by the Zone B reactor, the opposite order is also possible. That is, the higher molecular weight polyethylene is typically produced in the second reactor, but it could be produced in the first of the two reactors connected in series.

The process produces a polyethylene blend with a density greater than 0.935 g/cm³, preferably from 0.946 to 0.955 g/cm³. The density can be regulated by the amount of α-olefin used. As the amount of α-olefin is increased, the density decreases. The polyethylene blend has a bimodal molecular weight distribution. In addition, the ratio of Z-average molecular weight to weight average molecular weight ($M_z/M_w$) is greater than 10 and preferably greater than 15.

Preferably, the polyethylene blend has a low level of long-chain branching (LCB), more preferably, with a long-chain-branching index (LCBI) of less than 0.5. LCBI is a measure of the presence of small amounts of long-chain-branching in an essentially linear polyethylene and is defined and measured as described in R. Shroff and H. Mavridis, "A Long Chain Branching Index for Essentially Linear Polyethylenes," *Macromolecules* 32 (1999) 8454.

During polymer extrusion, when the pressure exerted by the die on the melt is released as the melt leaves the die, the melt swells. Zero-land die swell (So) is used to quantify the extent of extrudate swell for a sample extruded through a die with essentially zero land length. To measure So, a sample is loaded into an Instron 3211 capillary rheometer, melted at 190° C., then extruded through a cylindrical die (diameter=0.034"; length=0.0") at a shear rate of 1025 s⁻¹. The diameter of the extruded strand is measured using a Laser-Mike micrometer (Model 192-10) attached near the exit of the die. Die swell is reported as the ratio of the strand diameter to the orifice diameter. When the polyethylene exhibits too little swell, it can become difficult or impossible to properly fill the extremities of the mold, such as the handle of a blow-molded bottle.

Melt strength determines how much deformation and sag the parison will experience as it is being formed before mold closing and inflation. As the melt leaves the die, it extends and this parison sag influences parison dimensions.

High melt strength is necessary for many applications. Melt strength can be measured rheologically and can be reported as the value of the complex viscosity (ETA*) in megapoise at a complex modulus of $2\times10^4$ dyn/cm$^2$ and a temperature of 190° C. (see J. M. Dealy and K. F. Wissburn, "Melt Rheology and Its Role in Plastics Processing", Van Nostrand Reinhold, New York, 1990). While both high melt strength and high extrudate swell are desirable, generally extrudate swell decreases with increasing melt strength. In a plot of extrudate swell (So) on the y axis versus melt strength (ETA*) on the x axis, we can draw a line that fits the equation, $So=2.75-0.5\cdot\log_{10}(ETA^*)$. We believe that polyethylene blends from our process will have an unusual and excellent combination of high melt strength and high extrudate swell and will be above the line, while commercial or other known polyethylenes have a relatively inferior combination of melt strength and extrudate swell and are known to be below the line.

The following examples merely illustrate the invention. Those skilled in the art will recognize many variations that are within the spirit of the invention and scope of the claims.

EXAMPLE A

Calculation of $M_z/M_w$ as a Function of Composition Ratio

It can be shown on fundamental grounds that a bimodal Ziegler-Natta resin with a composition ratio (CR) around 50%, where CR is the percentage of A in the blend, will typically have $M_z/M_w$ less than about 10. For that purpose, consider a binary blend of components A and B. Let $M_w$ be the target weight average molecular weight of the blend. We want to examine how the polydispersity ($M_z/M_w$ and $M_w/M_n$) of the blend will vary with CR and the ratio of the two component molecular weights $M_{w,B}/M_{w,A}$. Therefore, we seek to determine $M_z/M_w$ and $M_w/M_n$ of the blend, on the basis of specified CR, $M_w$, $M_{w,B}/M_{w,A}$ and $(M_z/M_w)_A$, $(M_w/M_n)_A$, $(M_z/M_w)_B$, and $(M_w/M_n)_B$. It can be shown (see for example, L. H. Peebles, Jr., "Molecular Weight Distributions in Polymers", J. Wiley, 1971) that the $M_z/M_w$ and $M_w/M_n$ of the blend are given by:

$$\frac{M_z}{M_w} = \left(\frac{CR}{100}\right)\cdot\left(\frac{M_{w,A}}{M_w}\right)^2\cdot\left(\frac{M_{z,A}}{M_{w,A}}\right) + \left(\frac{100-CR}{100}\right)\cdot\left(\frac{M_{w,B}}{M_{w,A}}\right)^2\cdot\left(\frac{M_{w,A}}{M_w}\right)^2\cdot\left(\frac{M_{z,B}}{M_{w,B}}\right) \quad (1)$$

$$\frac{M_w}{M_n} = \left(\frac{CR}{100}\right)\cdot\frac{\left(\frac{M_{w,A}}{M_{n,A}}\right)}{\left(\frac{M_{w,A}}{M_w}\right)} + \left(\frac{100-CR}{100}\right)\cdot\frac{\left(\frac{M_{w,B}}{M_{n,B}}\right)}{\left(\frac{M_{w,A}}{M_w}\right)\cdot\left(\frac{M_{w,B}}{M_{w,A}}\right)} \quad (2)$$

$$M_w = \frac{CR}{100}\cdot M_{w,A} + \frac{100-CR}{100}\cdot M_{w,B} \Rightarrow \frac{M_{w,A}}{M_w} = \frac{1}{\frac{CR}{100}+\left(\frac{100-CR}{100}\right)\cdot\left(\frac{M_{w,B}}{M_{w,A}}\right)} \quad (3)$$

For illustration, we will assume $(M_z/M_w)_A=(M_w/M_n)_A=4$ and $(M_z/M_w)_B=(M_w/M_n)_B=4$ (typical values for Ziegler-Natta resins). Calculated results from equations (1-3) appear below (see Table 1) for three levels of $M_{w,B}/M_{w,A}$ (2, 8, and 20). Note that for the typical CR around 40-60%, the blend $M_z/M_w$ is less than about 9. In order to reach a blend $M_z/M_w$ of 10 or greater, it is necessary to have $M_{w,B}/M_{w,A}$ greater than about 8 and CR about 70 to 95%.

TABLE 1

Calculation of $M_z/M_w$ as a Function of Composition Ratio

| | $M_{w,B}/M_{w,A}=2$ | | | $M_{w,B}/M_{w,A}=8$ | | | $M_{w,B}/M_{w,A}=20$ | | |
|---|---|---|---|---|---|---|---|---|---|
| CR | $M_z/M_w$ | $M_w/M_n$ | $M_{w,A}/M_w$ | $M_z/M_w$ | $M_w/M_n$ | $M_{w,A}/M_w$ | $M_z/M_w$ | $M_w/M_n$ | $M_{w,A}/M_w$ |
| 0   | 4.00 | 4.00 | 0.50 | 4.00  | 4.00  | 0.13 | 4.00  | 4.00  | 0.05 |
| 5   | 4.05 | 4.10 | 0.51 | 4.16  | 5.16  | 0.13 | 4.19  | 7.43  | 0.05 |
| 10  | 4.10 | 4.18 | 0.53 | 4.33  | 6.21  | 0.14 | 4.40  | 10.50 | 0.06 |
| 15  | 4.15 | 4.26 | 0.54 | 4.52  | 7.12  | 0.14 | 4.63  | 13.21 | 0.06 |
| 20  | 4.20 | 4.32 | 0.56 | 4.72  | 7.92  | 0.15 | 4.88  | 15.55 | 0.06 |
| 25  | 4.24 | 4.38 | 0.57 | 4.94  | 8.59  | 0.16 | 5.16  | 17.54 | 0.07 |
| 30  | 4.29 | 4.42 | 0.59 | 5.18  | 9.15  | 0.17 | 5.48  | 19.16 | 0.07 |
| 35  | 4.33 | 4.46 | 0.61 | 5.45  | 9.57  | 0.18 | 5.84  | 20.43 | 0.07 |
| 40  | 4.38 | 4.48 | 0.63 | 5.74  | 9.88  | 0.19 | 6.25  | 21.33 | 0.08 |
| 45  | 4.41 | 4.50 | 0.65 | 6.06  | 10.06 | 0.21 | 6.73  | 21.87 | 0.09 |
| 50  | 4.44 | 4.50 | 0.67 | 6.42  | 10.13 | 0.22 | 7.27  | 22.05 | 0.10 |
| 55  | 4.47 | 4.50 | 0.69 | 6.82  | 10.06 | 0.24 | 7.92  | 21.87 | 0.10 |
| 60  | 4.49 | 4.48 | 0.71 | 7.26  | 9.88  | 0.26 | 8.69  | 21.33 | 0.12 |
| 65  | 4.50 | 4.46 | 0.74 | 7.75  | 9.57  | 0.29 | 9.61  | 20.43 | 0.13 |
| 70  | 4.50 | 4.42 | 0.77 | 8.28  | 9.15  | 0.32 | 10.76 | 19.16 | 0.15 |
| 75  | 4.48 | 4.38 | 0.80 | 8.86  | 8.59  | 0.36 | 12.19 | 17.54 | 0.17 |
| 80  | 4.44 | 4.32 | 0.83 | 9.44  | 7.92  | 0.42 | 14.03 | 15.55 | 0.21 |
| 85  | 4.39 | 4.26 | 0.87 | 9.95  | 7.12  | 0.49 | 16.42 | 13.21 | 0.26 |
| 90  | 4.30 | 4.18 | 0.91 | 10.10 | 6.20  | 0.59 | 19.45 | 10.50 | 0.34 |
| 95  | 4.17 | 4.10 | 0.95 | 9.11  | 5.16  | 0.74 | 22.04 | 7.43  | 0.51 |
| 100 | 4.00 | 4.00 | 1.00 | 4.00  | 4.00  | 1.00 | 4.00  | 4.00  | 1.00 |

EXAMPLE 1

Slurry Polymerization

A Ziegler-Natta catalyst is prepared according to U.S. Pat. No. 4,464,518. The catalyst is dispersed in hexane to form a catalyst slurry, which is continuously combined in a first slurry reactor with triethylaluminum, hexane, hydrogen, ethylene, and 1-butene at 1 MPa and 80° C. to give a first polyethylene which is transferred into a flash drum where a portion of the volatile materials are removed. The mixture is then continuously transferred to a second reactor. Hexane, hydrogen, 1-butene, and ethylene are continuously fed into the second reactor at 1 MPa and 80° C. to give a blend of a polyethylene prepared in the first reactor with polyethylene prepared in the second reactor. The feed to the first and second reactors is adjusted to make 80% by weight of the polyethylene blend in the first reactor and to make the ratio of $M_w$ of the second-reactor polyethylene/$M_w$ of the first-reactor polyethylene=20. The polyethylene blend is expected to have a bimodal molecular weight distribution, $M_z/M_w>10$, and an extrudate swell, So, given by:

$$So > 2.75 - 0.5 \cdot \log_{10}(ETA^*)$$

where ETA*, a measure of melt strength, is the complex viscosity in megapoise measured rheologically at 190° C. and at a complex modulus of $2 \times 10^4$ dyn/cm$^2$

COMPARATIVE EXAMPLE 2

A slurry polymerization is performed in two reaction zones in similar fashion as in Example 1. The feed to the first and second reactors is adjusted to make 66% by weight of the polyethylene blend in the first reactor and to make the ratio of $M_w$ of the second-reactor polyethylene/$M_w$ of the first-reactor polyethylene=6.9. The polyethylene blend has a bimodal molecular weight distribution, density=0.954 g/cm$^3$, melt index=0.3, and $M_z/M_w=9.3$. The measured melt strength is 0.4 Mpoise. The measured extrudate swell of 2.85 is less than the maximum value for So that one can calculate for a polymer having ETA*=0.4 Mpoise using the equation from Example 1, which is So=2.95. Therefore, the process of the invention should provide polyethylene blends having a relatively superior balance of extrudate swell and melt strength.

COMPARATIVE EXAMPLE 3

A slurry polymerization is performed in two reaction zones in similar fashion as in Example 1. The feed to the first and second reactors is adjusted to make 47% by weight of the polyethylene blend in the first reactor and to make the ratio of $M_w$ of the second reactor polyethylene/$M_w$ first reactor polyethylene=28.5. The polyethylene blend has a bimodal distribution, density=0.949, melt index=0.03, and $M_z/M_w=7.4$. The measured melt strength is 4.4 Mpoise. The measured extrudate swell of 2.27 is less than the maximum value for So that one can calculate for a polymer having ETA*=4.4 Mpoise, which is So=2.43. Therefore, the process of the invention should provide polyethylene blends having a relatively superior balance of extrudate swell and melt strength.

COMPARATIVE EXAMPLE 4

A commercial blow-molding grade of polyethylene (Petrothene LB 5003, available from Equistar Chemicals, LP) is tested. The polyethylene has density=0.950 g/cm$^3$, melt index=0.32, and $M_z/M_w=9.3$. The measured melt strength is 0.5 Mpoise. The measured extrudate swell of 2.81 is less than the maximum value for So that one can calculate for a polymer having ETA*=0.5 Mpoise, which is So=2.90. Therefore, the process of the invention should provide polyethylene blends having a relatively superior balance of extrudate swell and melt strength.

The comparative examples demonstrate that commercial or known polyethylene blends have a combination of melt strength and extrudate swell properties that fall below the line defined by the equation in Example 1. In contrast, the process of the invention should consistently provide polymer blends having combined melt strength and extrudate swell properties that are above the line.

The preceding examples are meant only as illustrations. The following claims define the invention.

We claim:

1. A process which comprises polymerizing ethylene in the presence of a Ziegler-Natta catalyst system in a reactor consisting of two slurry reaction zones, Zone A and Zone B, connected in series, wherein from 70-95% by weight of the polyethylene is produced in Zone A and the ratio of weight average molecular weight of Zone B: Zone A polyethylene is greater than 8:1, to produce a polyethylene blend with a bimodal molecular weight distribution, a density greater than 0.935 g/cm$^3$, a ratio of Z-average molecular weight to weight average molecular weight ($M_z/M_w$) of greater than 10, and an extrudate swell (So) at a melt strength expressed as the value of complex viscosity (ETA*) in megapoise at 190° and at a complex modulus of $2 \times 10^4$ dyn/cm$^2$ defined by:

$$So > 2.75 - 0.5 \cdot \log_{10}(ETA^*).$$

2. The process of claim 1 wherein a $C_3$-$C_{10}$ α-olefin is copolymerized with the ethylene.

3. The process of claim 1 wherein the ratio of the weight average molecular weights of Zone B: Zone A polyethylenes is from 20:1 to 50:1.

4. The process of claim 1 wherein the polyethylene blend has a density from 0.946 to 0.955 g/cm$^3$.

5. The process of claim 1 wherein each zone is operated at a temperature of from about 60° to about 100° C.

6. The process of claim 1 wherein the polyethylene blend has an $M_z/M_w$ greater than 15.

7. The process of claim 1 wherein the polyethylene blend has a long-chain-branching index less than 0.5.

8. The process of claim 1 wherein the Ziegler-Natta catalyst system comprises a cocatalyst selected from the group consisting of trialkylaluminums, dialkylaluminum halides and alkylaluminum dihalides, a Group 4-6 transition metal compound, and a magnesium compound.

9. The process of claim 8 wherein the Group 4-6 transition metal compound is a titanium compound.

10. The process of claim 8 wherein the Ziegler-Natta catalyst system comprises:
  a) a cocatalyst selected from the group consisting of trialkylaluminums, dialkylaluminum halides, and alkylaluminum dihalides; and
  b) a supported transition metal mixture comprising the reaction product of:
    1) a halogen-containing Group 4-6 transition metal compound; and
    2) an organoaluminum-siloxane containing mixture comprising the reaction product of:
      (a) an organoaluminum compound; and
      (b) the reaction product of a polymethyl-hydrosiloxane and an organic magnesium halide.

11. The process of claim 10 wherein the halogen-containing Group 4-6 transition metal compound is titanium tetrachloride.

* * * * *